United States Patent [19]

Lasko et al.

[11] 3,781,040
[45] Dec. 25, 1973

[54] PIPE JOINT SEAL

[76] Inventors: John A. Lasko, 50 Notch Hill Rd., North Branford, Conn.; Elwood R. Horwinski, 727 Moss Farms Rd., Cheshire, Conn. 06410

[22] Filed: Nov. 27, 1972

[21] Appl. No.: 309,902

[52] U.S. Cl................ 285/110, 285/374, 285/404, 285/175
[51] Int. Cl.............................................. F16l 17/00
[58] Field of Search................... 285/404, 110, 374, 285/177, 334.3, 281, 98, 175

[56] References Cited
UNITED STATES PATENTS
1,000,799   8/1911   Grimes........................... 285/110 X
2,146,100   2/1939   Waluh............................ 285/404 X
2,465,708   3/1949   Chapin........................... 285/110 X

*Primary Examiner*—Dave W. Arola
*Attorney*—H. Gibner Lehmann et al.

[57] ABSTRACT

A pipe joint seal for coupling two adjacent ends of aligned pipe sections, the seal comprising an annular fitting member internally threaded at one end to receive a corresponding threaded end of one pipe section, and an annular resilient sealing ring having an external annular flange, the ring being carried in the bore of the fitting and being adapted for engagement with the end of the second pipe section. The ring comprises a cylindrical body portion extending on opposite sides of the flange, the body portion being for sealing engagement with the bores of the fitting and of the second pipe section such that the internal pressure of fluid carried by the pipe tends to cause radial expansion of the ring into forcible engagement with the bores. The fitting has a plurality of substantially radially extending holes in which there are received set screws, which can engage external shoulders of the second pipe section after the latter is received in the bore of the fitting, to force and maintain together the fitting and the second, unthreaded pipe section.

6 Claims, 6 Drawing Figures

PATENTED DEC 25 1973 3,781,040
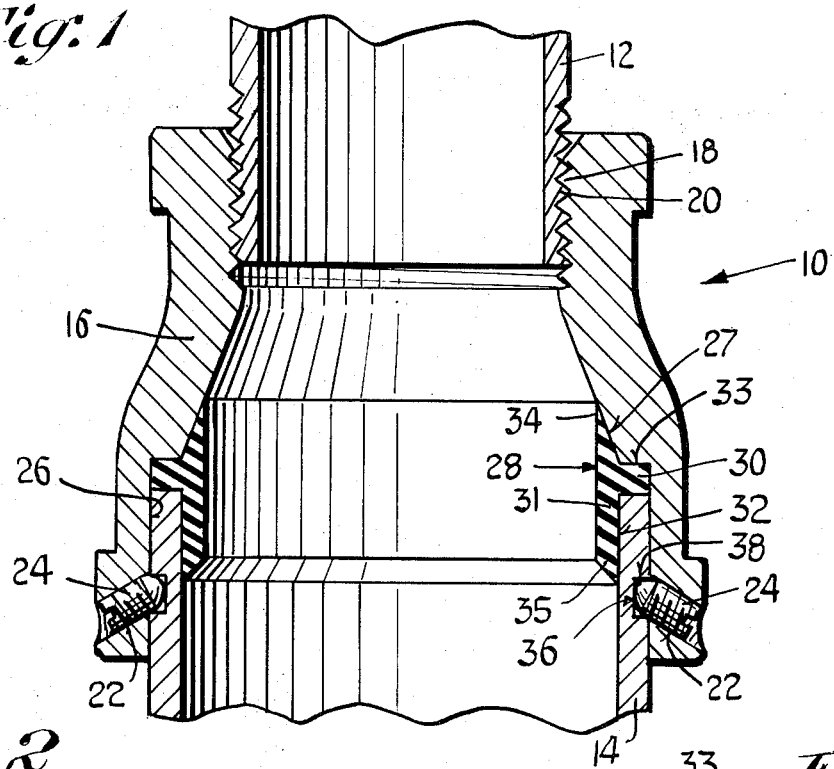
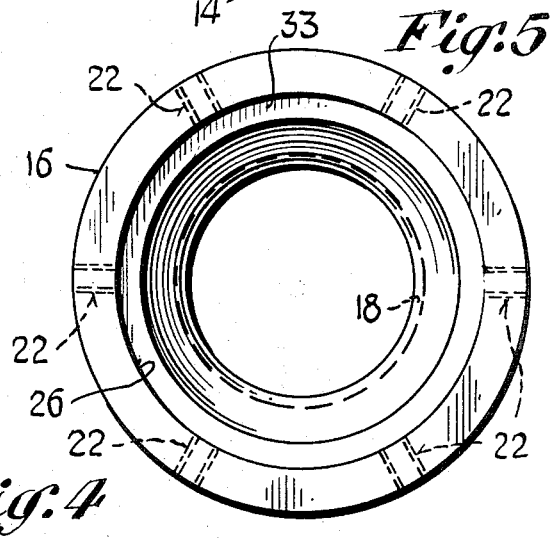
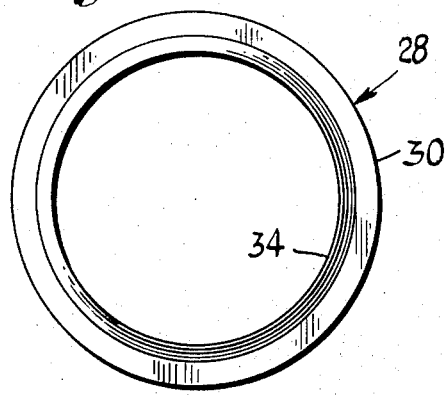
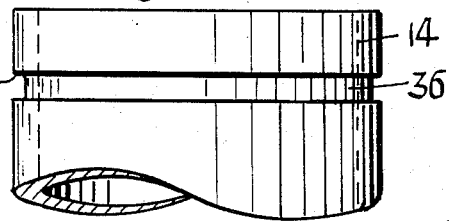
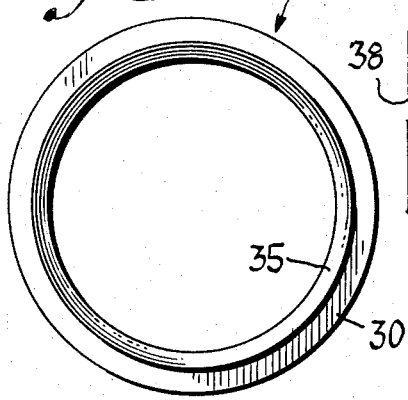
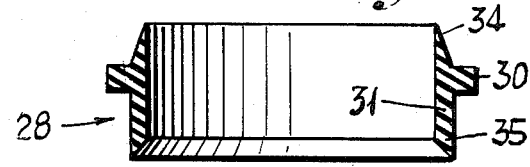

PIPE JOINT SEAL

BACKGROUND

This invention relates to pipe joint seals for coupling adjacent ends of aligned pipe sections, and more particularly to seals of the type employing an annular fitting which is rigidly connected to one section and which is releasably yet sealingly connected to the other section. In the past, a number of pipe coupling devices have been proposed and constructed. Prior constructions have employed annular fittings rigidly fastened to the end of one pipe section, the fittings having radially extending set screws for engagement with an enlarged or outwardly turned edge or flange portion of the second pipe section. A rubber or plastic sealing ring of annular configuration was carried in the bore of the fitting and simultaneously engaged an adjacent shoulder thereof and shoulder of the pipe section to form a seal therebetween. Several problems became apparent with the above construction. First, the flange required on second pipe section had to be cast integral with the remainder of the pipe during manufacture thereof. Also, the flange was frequently of larger diameter than the pipe section itself, and sometimes caused difficulty in the stacking or transporting of large numbers of pipe sections.

Also, the simple ring-shaped seal gasket often yielded excessively under the stress of high-internal fluid pressures, which resulted in undesirable leaks from the pipe joint, such leaks being particularly bothersome when the fluid was of oil or of caustic chemical composition.

SUMMARY

The above disadvantages of prior pipe coupling devices are obviated by the present invention which has for an object the provision of an improved pipe joint seal which is extremely simple in construction, effective in operation, and which results in an improved seal between the sections. A related object is the provision of a pipe joint seal device which can be employed with pipes having an essentially cylindrical configuration with no portions thereof extending laterally beyond the outside radius of the pipe.

The above objects are accomplished by the provision of annular fitting member having an internally threaded portion to enable it to be screwed onto the end of one pipe section, the fitting further having a bore to receive one end of a second pipe section, and to receive a sealing ring carried in the bore of the fitting. The ring is characterized by an external annular flange engageable with the end of the second pipe section and with an annular internal shoulder of the fitting. The ring is further provided with a cylindrical portion extending axially on opposite sides of the flange for engagement with the bores of the fitting and second pipe section respectively, such that internal fluid pressures on the ring cause the latter to expand radially and to forcibly engage the bores. The fitting carries a plurality of radially extending set screws extending into the bore thereof and engageable with shoulder portions of an annular groove of the second pipe section, to thereby facilitate quick assembly and disassembly of the second pipe section and the first pipe section and fitting and to force and maintain together the second pipe section and fitting.

Other features and advantages will hereinafter appear.

In the drawings, illustrating a preferred embodiment of the invention:

FIG. 1 is a vertical sectional view of the improved pipe joint seal of the present invention, the seal being shown as coupling adjacent end of aligned pipe sections.

FIG. 2 is a top plan view of the annular sealing ring as employed in the pipe joint seal of the present invention.

FIG. 3 is a bottom plan view of the sealing ring of FIG. 2.

FIG. 4 is a front elevational view of one pipe section, particularly illustrating the annular groove in the outside wall thereof by which the section can be releasably secured to the fitting.

FIG. 5 is a bottom plan of the annular fitting member of FIG. 1, showing the relative locations of the set screws carried thereby.

FIG. 6 is a side elevational view of the sealing ring employed with the pipe joint seal of the present invention.

Referring to FIG. 1, there is illustrated a pipe joint seal generally designated by the numeral 10, for coupling two adjacent ends of aligned pipe sections 12 and 14. The seal comprises an annular cast iron fitting 16 having at one end internal threads 18 to receive the threaded end 20 of one pipe section 12, and having at its other end a plurality of substantially radially extending threaded holes 22 carrying set screws 24. As illustrated, the threaded holes 22 are disposed at a small angle with respect to a radial line of the fitting. The set screws have V-shaped tip portions for engagement with the external wall of the pipe section 14 when the latter is received in the longitudinal bore 26 of the fitting 16.

In accordance with the present invention there is provided an improved pipe joint seal element comprising an annular sealing ring 28 carried in the bore 26 of the fitting, the ring having an external annular flange 30 and a cylindrical body portion 31 extending on opposite sides of the flange 30, for sealing engagement with the bore 26 of the fitting and the bore 32 of the pipe section 14. As shown in FIGS. 1–3, the opposite end portions 34, 35 of the ring body portion 31, are tapered in thickness and thus present feathered edges, closely juxtaposed to the circular walls defining the bores 26 and 32. As best illustrated in FIG. 1, the bore 26 has an internal shoulder 33 and a tapered portion 27, the latter being engageable by the corresponding tapered end 34 of the ring 28. By the present invention, the ring 28 is resilient and is capable of undergoing limited radial expansion when under the influence of internal fluid pressure within the pipe. Thus, the ring 28 is urged into forcible engagement with the bores 26 and 32 of the fitting and second pipe, respectively, and as a result of the large surface area thereof being in close juxtaposition to the sealing ring, a tight and virtually leakproof releasable joint is achieved.

In accordance with the present invention, the pipe 14 is provided with an external annular groove 36 providing an abutment shoulder 38 engageable by the set screws 24. As illustrated in FIGS. 1 and 4, the shoulder lies entirely within the outer diameter of the pipe section 14. The groove is preferably machined in the pipe section after it has been cast, the machining operation being simpler and less costly than employing a special casting apparatus for incorporating such a groove in the section. There is preferably a snug fit between the fitting 16 and the pipe section 14 such as to minimize relative movement between the two once they are assembled.

Connection of the fitting 16 to the pipe section 14 is readily accomplished. With the sealing ring 28 disposed in the bore and with the flange 30 thereof engaging the shoulder 33 of the fitting, the section 14 is inserted fully into the bore 26. The set screws are then tightened, forcing the section 14 to sealingly engage and compress the flange 30 against the shoulder 33. Referring to FIG. 6, it can be seen that as this is done, a compressive force is applied to the flange 30 such that the opposite ends 34, 35 of the sealing ring are urged in a direction radially outward, so as to even more tightly engage the tapered portion 27 of the bore 26 and the bore 32 of the pipe section 14. Hence, the compression of the flange 30 and the effect of internal fluid pressure on the sealing ring 28 have a beneficial result of improving the effectiveness of the seal. By such an arrangement an excellent seal is thus made possible. There is had the additional advantage of easy removal of the section 14 should it ever be necessary, such removal requiring only the loosening of the set screws 24.

From the above it can be seen that we have provided a novel and improved pipe joint seal which is simple in construction, effective in operation and which can be easily and readily installed to provide a highly leak-resistant joint in a matter of several minutes time. The seal is thus seen to represent a distinct advance and improvement in the art.

Variations and modifications are possible without departing from the spirit of the invention.

We claim:

1. Means for sealingly joining together two adjacent ends of aligned pipe sections comprising, in combination:
   a. an annular fitting member having at one end internal screw threads to receive the threaded end of one pipe section,
   b. said fitting having at its other end a plurality of threaded holes passing through the walls thereof generally in radial directions,
   c. set screws carried in said threaded holes of the fitting, for engagement with external abutment shoulders of a second pipe section to thereby secure said other pipe section within the bore of the fitting,
   d. an annular resilient sealing ring disposed in the bore of the fitting, said ring having an external annular flange adapted for engagement with the end of said second pipe section,
   e. said fitting having an annular internal shoulder engaged by the flange of said sealing ring,
   f. said sealing ring having a cylindrical body portion extending axially on opposite sides of said flange and engagable respectively with the bores of said fitting and second pipe section whereby internal fluid pressures on the sealing ring cause the latter to expand radially and forcibly engage said bores.

2. The invention as set forth in claim 1, wherein:
   a. said sealing ring has tapered end portions reducing in thickness toward a feathered edge,
   b. said tapered end portions being yieldable and more responsive to internal fluid pressures.

3. The invention as set forth in claim 2, wherein:
   a. said fitting has a tapered bore engaged by one tapered end portion of the sealing ring.

4. The invention as set forth in claim 1, and further including:
   a. a second pipe section having external abutment shoulders to be engaged by said set screws,
   b. said abutment shoulders lying within the outer diameter of the pipe section.

5. The invention as set forth in claim 1, wherein:
   a. said other pipe section has an external annular groove engagable by said set screws.

6. The invention as set forth in claim 4, wherein:
   a. the bore of the fitting and the said other pipe section constitute a snug fit with one another to thereby minimize relative movement therebetween after they are joined together.

* * * * *